United States Patent Office 3,561,269
Patented Feb. 9, 1971

3,561,269
THERMOCHROMIC TEMPERATURE INDICATION
Joseph R. M. Seitz, Boston, Mass., assignor to Thermochromatic Systems, Inc., a corporation of Delaware
No Drawing. Continuation-in-part of application Ser. No. 636,601, May 8, 1967. This application Dec. 15, 1969, Ser. No. 885,373
Int. Cl. G01k 11/12
U.S. Cl. 73—356
17 Claims

ABSTRACT OF THE DISCLOSURE

Temperature sensing devices and thermometers such as solid flexible strips employ reversible solid thermochromic materials. Temperature sensing devices expose to view a continuous length of solid material which reversibly changes color while solid, the composition and hence the transition temperature gradually varying along the length. Compounds of the same ingredients with proportions varying along the length are disclosed, illustrated by $X_2HgI_4$ where $X_2$ comprises more than one metal in varying proportions. The devices employing flexible substrates are affixable to numerous surfaces, including labels on merchandise and the human body. Methods for production employ float zone techniques, and deposition, e.g., by printing or vapor condensation.

---

This application is a continuation-in-part of my copending application Ser. No. 636,601, filed May 8, 1967, now abandoned.

Temperature sensing devices expose to view a continuous length of solid material which reversibly changes color while solid, the composition and hence the transition temperature varying along the length. Compounds of the same ingredients with proportions varying along the length are disclosed, illustratedly $X_2HgI_4$ where $X_2$ comprises more than one metal in varying proportions.

Continuous variations, or successive portions of the material varying incrementally are discussed.

The devices employing flexible substrates are affixable to numerous surfaces, including labels on merchandise and the human body.

Methods for production employ float zone techniques, and deposition, e.g. by printing or vapor condensation.

Techniques for routine measurement of temperature have been generally limited in practice to the familiar thermometer wherein a bulb and capillary column of mercury are sealed within a length of glass. Such measurements are slow and such thermometers are costly, fragile and difficult to read.

One object of the present invention is to provide a novel solid thermometer which is inexpensive and can be easily and rapidly used to measure temperatures.

Another object is to provide solid thermometers or temperature sensitive devices operable to indicate the temperature of the human body.

Another object is to provide methods for manufacturing such devices.

According to one aspect of the invention there is provided a substrate, preferably a flexible strip or sheet, in whose surface are dispersed gradients or finite zones of materials which change from a color to one hue to a color of a second hue but at different temperatures. At any given temperature, there will be a position on the substrate below which there is a column of the first color but above which there is a column of the second color. As the temperature changes so do the relative lengths of the two colored columns. The shift in position of the boundary between the areas of different color gives a simple and precise and easily observed means for measuring temperature.

According to an aspect of the invention, a temperature-sensing device comprises a solid medium exposing to view a continuous length of solid, crystalline, reversible thermochromic material which changes color while remaining solid, the composition of the thermochromic material and hence the transition temperature varying along the length. In a preferred embodiment, this solid crystalline material comprises reaction products of a thermochromic compound and a reactant material having the property of changing the transition temperature in amounts dependent upon the amounts of the reactant employed, the reactant amount increasing along the length.

According to another aspect of the invention, a solid temperature-sensing device includes a solid medium comprising an array of contiguous solid reversible thermochromic material and a reactant material added to the thermochromic material in gradually varying amounts along the array, such that at any given temperature within the range of temperatures of the thermochromic materials, this array will be in the form of a first portion of a first color and an extending contiguous portion of a second color, the boundary between the colored portions indicating the given temperature; the reactant material is such as to change the transition temperature of the solid thermochromic material in varying amounts depending upon the amounts of reactant material added to the thermochromic material so as to continuously shift the position of the boundary between the colored portions as the temperature changes.

The invention further features a method of producing a solid temperature-sensing device of crystalline reversible thermochromic materials which change color while remaining crystalline by thermal reaction of at least two reactants, comprising distributing the reactants coextensively in proportions which vary along the length so as to produce a gradual change in transition temperature, and exposing the reactants to reaction conditions to form a continuous length of solid crystalline reversible thermochromic materials.

According to another aspect of the invention the thermochromic material is formed in a flexible substrate which is thin and affixable to a surface. In one embodiment a strip is provided with pressure-sensitive adhesive to secure it to a surface in heat-transferring relation. In another embodiment the thermometer is printed onto labels for merchandise.

The thermochromic materials used in this invention include salts such as silver mercuric iodide, $Ag_2HgI_4$, with selected amounts of either bromine and gold, or of a heavy metal such as copper added to produce thermochromic materials composed of the same chemical elements having the same color change at transition, but different reversible temperature transition points.

More specifically, the basic starting material, $Ag_2HgI_4$, changes color from light yellow to bright orange-red at about 50° C. I have found, however, that I can produce transition points at any desired point in the range of about 30° to 50° C. and still retain the same color change by incorporating different amounts of gold into the silver-mercury-iodine and silver-mercury-iodine-bromine compounds. One method of doing this is by adding gold salt at an elevated temperature in the absence of oxygen for a sustained period of time. The resultant light yellow product is ground to a powder, washed to remove unreacted ingredients and then dried. It can then be dispersed in a suitable lacquer or plastic, or applied as a surface coating on a flexible strip such as paper or cloth, or molded into an appropriate shape.

EXAMPLE 1

0.15 mole of $Ag_2HgI_4$ were reacted at 300° with 0.0075 mole of bromine for six hours in a quartz container. The resultant product was ground, washed with water and chloroform, and then dried. Its bromine content was determined to be approximately 4%. Its transition temperature was determined to be approximately 42° C., its color below 42° C. being yellow, and its color above 42° C. orange-red. These colors were substantially identical with the colors produced by $Ag_2HgI_4$ compound without bromine.

EXAMPLE 2

0.1 mole of $Ag_2HgI_4$ was reacted at 250° C. with 0.01 mole of bromine, and 0.005 mole of gold bromide for a period of 24 hours. The transition temperature of the crushed, washed, and dried product was 29° C. The colors observed were light yellow below the transition point and orange-red above the transition point.

By varying the proportions of gold salt added to the basic compound $Ag_2HgI_4$ and its brominated form, a graded series of compounds can be prepared whose transition temperatures vary by small increments, e.g., 0.1° C. In addition, a continuous gradient can be formed by the following procedure to provide compounds having a substantially linear gradient of transition temperatures.

EXAMPLE 3

An elongated quartz crucible is held vertically in an inert atmosphere and anhydrous gold bromide introduced. The crucible is then filled with $Ag_2HgI_4$. A small amount of bromine liquid is then added and the open end sealed. (The overpressure of bromine in the tube prevents the decomposition of the gold bromide.)

The sealed crucible is then placed in a zone leveling furnace and the temperature of the "hot" zone raised to above the melting point of the anhydrous gold bromide. The crucible is then drawn through slowly. This process produces silver mercuric iodide compounds containing a gradient of gold and an almost constant concentration of bromine.

When the crucible is opened, the materials may be removed in accordance with their positions with consequent variation in gold content and transition temperatures. Calibration to give continuous grading in such materials can be performed by methods well known to the art. In addition, a thermally resistant porous matrix may be incorporated into the interior of the crucible if desired so that the complexes are solidified in this matrix.

Another system which may be utilized to produce thermochromic materials is the system

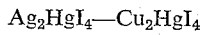

$Ag_2HgI_4$—$Cu_2HgI_4$ which may be written in the form of $X_2HgI_4$, where X represents both Ag and Cu totaling 2 moles. Since Ag and Cu may occupy the same crystalline lattice points, the salt $X_2HgI_4$ is a single phase crystalline material. As a specific example, transition temperatures within the human body temperature range (about 93° F. to about 104° F.) may be produced from $X_2HgI_4$ where $X_2$ is about 13.1 to 13.5 mol percent Cu and about 86.9 to 86.5 mole percent Ag. A composition melting at 98.6° F. is 13.3 mole percent Cu and 86.7 mole percent Ag, and has an empirical formula: $Ag_{1.734}Cu_{0.266}HgI_4$. It can be formed by the following procedure.

EXAMPLE 4

To a glass ampule, previously flushed with argon, add, in mole parts, 1.734 moles $Ag_2I$ and 0.266 mole of $Cu_2I$ per mole of $HgI_2$. Add free iodine in the amount of 100 milligrams of iodine per gram of solid iodide salt, seal the ampule and heat above the melting temperature of the mixture, about 330–550° C. (depending on the thickness of the ampule). Maintain the ampule at that temperature for about 1 to 5 hours with constant and sufficient agitation to produce a stoichiometric crystalline product, longer reaction times producing a more uniform product. Shorter reaction times may be obtained with increased amounts of free iodine for lowering the viscosity and improving mixing.

Slowly cool to room temperature, break the ampule to remove the contents, which are then cold ground (e.g., under liquid nitrogen) to produce particles of a few microns in size. These thermochromic particles may be recovered by extracting with chloroform or benzene to remove excess iodine. The resultant material may be dispersed in a suitable carrier, such as clear ink, and applied to a flexible backing material, such as paper or "Mylar" (a polyester film available from Du Pont), for use as a body temperature detector. The backing may include pressure sensitive adhesive that has good thermal conductivity, for applying a temperature sensitive device directly to the skin in the nature of a band aid.

A series of such materials may be prepared, since the transition temperature varies approximately linearly over the range of ±6° from 98.6° F., by changing the mole percent of CuI, per total moles of CuI and AgI, respectively, ±1.5%. A series of materials which has a gradually increasing temperature may then be laid down contiguously to one another to form an array or laid down in a continuous length.

In lieu of providing a plurality of thermochromic materials individually, a single continuous process may be employed.

EXAMPLE 5

The previously described $X_2HgI_4$ system, where X is Ag and Cu in desired proportions, is particularly adaptable to float zoning (zone leveling) techniques since, unlike the system described in Example 3, there are no vapor pressure or decomposition problems (due previously to the instability of AuI), and there is a coherently melting reactant. In general, in a narrow tube a first zone including a first reactant material at the bottom of the tube, and a further zone of a second reactant material on top of the first material is employed. The first zone typically contains an admixture of first and second reactant materials, with the first material to be float zoned into the second zone at a controlled, predetermined rate.

A floating zone is established, e.g., by an electric heater employing a loop of Nichrome wire disposed around the tube for movement axially of the tube, conveniently controlled in its axial speed by a variable speed drive.

To produce the desired material gradient throughout the length of the tube, the zone is moved at a speed dependent on the segregation constant of the material at any point along the tube, which varies with the composition of the material. In addition, when a ternary system such as $AgI_2$-$CuI_2$-$HgI$ is involved, the speed of relative movement of the zone must be mapped from the ternary phase diagram of the system and its isotherm of thermochromic transition. Methods of mapping such systems as well as dealing with segregation constants can be accomplished by those familiar with the gradient drifting and float zoning arts and the technology of semiconductor crystal growth, purification and doping.

In the case of $X_2HgI_4$, the first zone may contain a mixture of $Ag_2HgI_4$ and $CuI_2$ and the second zone only $Ag_2HgI_4$, and the process will proceed to cause copper to replace silver in the salt. Alternatively, dependent, among other considerations, on the temperature range desired for the final thermochromic material, the first zone may contain a mixture of $Cu_2HgI_4$ and $AgI_2$ and the second zone merely $Cu_2HgI_4$.

A solid mass of thermochromic material can be produced as follows. A mixture of an appropriate ratio of CuI and $Ag_2HgI_4$ (the proportion chosen for the temperature range desired) is placed in the bottom of a tube to form a first zone, and the remainder of the tube (second zone) is filled with $Ag_2HgI_4$.

Iodine vapor is passed through the system, with an inert carrier gas such as helium or argon, while heating the reactants in the tube uniformly to their sintering temperature. After the material has sintered to a coherent mass, the temperature of the $CuI_2$ zone is raised to its melting point. After it melts, the Nichrome wire is moved up the tube (or, alternatively, the tube is moved relative to a heater).

Zone movement is commenced at a speed such that a fraction of copper present is left in the solidus directly behind the moving zone, and the speed is regulated to produce the desired gradient. The segregation constant of the particular ternary salt at any point axially along the tube may be taken into account as the process proceeds in the following way: If, e.g., the segregation constant is positive, the travelling zone tends to leave more copper behind than existed as trace impurities in the preceding zone. Under this condition, if it is desired at a given point (as determined by the isotherm on the phase diagram) to gradually increase the amount of copper being deposited along the tube, the speed of transit should be gradually reduced. Similarly, if at a given point the segregation constant is determined to be negative, an increase of speed will increase the amount of copper deposited. Also, the particular amount of speed change will depend upon the numerical value of the constant.

The zone is moved until the desired thermochromic materials are deposited along the tube, so as to give a gradually varying transition temperature.

Mapping of the phase diagram, as mentioned above, is a consideration when other processes are employed for producing the gradient. Whatever the process employed for producing a desired thermochromic salt from AgI, CuI, and $HgI_2$, the amount of $HgI_2$ along the gradient is advantageously held constant with the total amount of AgI and CuI comprising 2 moles, per mole of $HgI_2$ along the gradient. Then the specific composition variance which will produce transition temperatures forming a gradual temperature gradient may be determined, e.g. by experiment or mathematical analysis of the phase diagram of the ternary system.

For the particular temperature range desired, a mathematical function or intersection of functions can be defined for approximating a linear temperature gradient. This compositional function and its inverse can be then used, respectively, to determine the proportion of AgI and CuI as a function of position along the gradient.

An example of a mechanical deposition process is silk screen printing. The substrate is coated or printed uniformly with $HgI_2$ and then AgI and CuI are applied in varying amounts along the substrate by use of silk screen masks. In other words the weight of printed AgI and CuI material is varied along a dimension of the print roller by employing variations in the area of the holes in the printing masks or screens, with the sum of areas, after compensation for variation of rates of depositions through these masks, corresponding to the 1 to 1 ratio of (Cu+Ag) to Hg. Other color printing techniques may also be employed.

Another method of deposition is that of vacuum coating and sputtering techniques in which the AgI and CuI vapors (or other materials) condense upon the substrate. The substrate may be previously prepared with one of the reactants (e.g. $HgI_2$) or all may be applied at the same time. One of the advantages of this process is the intimate mixing that can be achieved due to the small size of the condensed particles.

For one example, a number of evaporating boats or crucibles can be disposed in parallel with the axis of a roll on which the substrate moves as it is coated. For the example given, one boat contains $HgI_2$, another AgI and another CuI. A pair of collimating shutters are disposed across each boat, the effective aperture being varied along the boat length, in the case of AgI and CuI, in accordance with the desired proportions to obtain the gradient. According to one method of operation, all boats may be heated to evaporate all three vapors at once, and the vapors focused to coat on the substrate either successively or all at once. After all three vapors are deposited the formula $X_2HgI_4$ holds throughout the length of the boats (transverse to the direction of movement of the substrate on the roll), while the proportions of CuI to AgI are varied as desired due to the conformation of the shutters.

The heat of condensation of the three vapors may be sufficient alone to produce the desired reaction; if not additional heat may be introduced, e.g. by a microwave generator.

For another example, employing xerographic techniques coupled with sputtering, a charge image on a selenium roll charges, in a similar pattern, a substrate on the roll. The substrate is exposed to a vacuum sputtering source and vapors therefrom deposit on the substrate in accordance with the charge pattern. In successive treatments the appropriate amounts of CuI and AgI may be deposited in a coextensive relation, and then or later reacted to form the desired gradient.

In still other methods of the invention, chromotographic techniques and electrochemical deposition techniques can be employed to produce the desired gradient.

After deposition, by whatever technique, if the deposited substances have not fully reacted locally to form a single thermochromic material of uniform stoichiometric composition, the reaction should be completed by heating.

The substrates for deposition of materials thereon must withstand the reactant conditions. Where conditions require heating of the substrate, suitable substrates include asbestos paper, Mylar (polyester) tape, Teflon, porous ceramics, and metals. Where the desired substrate cannot withstand heating, such as some papers, then heating techniques can be employed which do not affect the substrate, e.g. the techniques mentioned above in connection with vapor deposition.

Advantageously the substrate which carries the thermochromic material serves to affix the device to another member. Thus the substrate may be glued onto a printed label or it may be formed as a part of the label, adjacent to printed text. Advantageously flexible strips are provided with pressure sensitive adhesive on the back side, suitable for affixing the device wherever temperatures are to be measured. Special formulations of heat conductive adhesive may then be employed for heat transfer from a surface to which the device is affixed.

Thus, a graded series of compounds, varying by small increments, or a gradient can be deposited on or in a strip of material to provide a solid thermometer. If the strip is relatively thin and flexible, it can be used as a surface thermometer. Inasmuch as the surface temperatures of certain parts of the human body, e.g. forehead, armpit, etc., are directly related to so-called blood or body temperature, properly calibrated flexible strips can be quickly affixed to the foreheads of a large number of patients to give body temperature readings.

Further, since the presence or absence of fever is very crucial in medicine, a surface strip containing a single thermochromic material whose transition temperature corresponds to a body temperature slightly above normal can be used as a spot fever detector.

This invention can also be used to provide a novel bandage so as to render visible the area of skin inflammation below the bandage. Thus, bandage material could be impregnated by an array of small spaced sections of thermochromic materials having a transition temperature corresponding to a body or blood temperature slightly above normal. If one of these sections is in contact with an inflamed area, it will cause a color change in that section but not in the other sections.

Numerous other embodiments will occur to those skilled in the art within the spirit and scope of the invention.

What is claimed is:

1. A temperature-sensing device comprising a solid medium exposing to view a continuous length of solid crystalline reversible thermochromic material which changes color while remaining solid, the composition of said thermochromic material (and hence the transition temperature) varying along said length.

2. The device of claim 1 wherein said solid crystalline thermochromic material comprises reaction products of a thermochromic compound and a reactant material having the property of changing the transition temperature in amounts dependent upon the amounts of said reactant employed, the quantity of said reactant increasing along said length.

3. The device of claim 1 wherein said thermochromic material is defined broadly by the formula $X_2HgI_4$ where X is Ag and Cu in varying proportions along said length.

4. The device of claim 3 wherein $X_2$ varies along said length between about 13.1 mole percent copper with 86.9 mole percent silver and 13.5 mole percent copper with 86.5 mole percent silver, said device adapted to indicate the temperature of the human body.

5. The device of claim 1 in the form of a surface temperature detector, said solid medium being disposed in a flexible strip which is thin and affixable to a surface.

6. The device of claim 5 wherein said device comprises a flexible sheet in the form of a printed label adapted for affixation to merchandise.

7. The device of claim 5 wherein the back side of said strip includes pressure sensitive adhesive adapted for affixation of said device to another member.

8. A device of claim 1 wherein said thermochromic material comprises a vapor deposit adhered to a visible surface of a flexible substrate.

9. The device of claim 1 wherein said thermochromic material comprises a printed deposit upon a visible surface of a flexible substrate.

10. The device of claim 1 wherein said thermochromic material comprises a bath deposit on a substrate.

11. A solid temperature-sensing device including a solid medium comprising an array of contiguous solid reversible thermochromic materials of increasing transition temperatures formed of a thermochromic material and a reactant material added to the thermochromic material in gradually varying amounts along the array.

at any given temperature within the range of temperatures of said thermochromic materials, said array being in the form of a first portion of a first color and an extending contiguous portion of a second color, the boundary between said colored portions indicating said given temperature, the reactant material having the property of changing the transition temperature of said solid thermochromic material in varying amounts dependent upon the amounts of said reactant material added to said thermochromic material so as to continuously shift the position of said boundary between said colored portions as the temperature changes.

12. A method of producing a solid temperature-sensing device of crystalline reversible thermochromic materials which change color while remaining crystalline by thermal reaction of at least two reactants, comprising forming a continuous array of constant quantity of one reactant, introducing to said array the second reactant in quantities which gradually increase along said array, and exposing said reactants to reaction conditions to form a continuous array of solid crystalline reversible thermochromic materials.

13. In a method for producing a temperature-sensing device in the form of a solid medium exposing to view a continuous length of solid crystalline reversible thermochromic material which changes color while remaining solid by thermal reaction of at least two reactants, the steps comprising distributing at least two reactants coextensively along a length in proportions which vary along the length so as to produce a gradual change in transition temperature, and exposing said reactants to reaction conditions to form a continuous length of solid crystalline reversible thermochromic materials, the resultant composition of said thermochromic material (and hence the transition temperature) varying along said length.

14. The method of claim 13 including depositing said reactants upon a flexible substrate and reacting said reactants after said deposit.

15. The method of claim 14 including depositing at least one of said reactants in varying amounts by condensation of a pattern of vapors of said reactant that varies along the length.

16. The method of claim 15 in which the heat of condensation of said vapors is employed to assist said reaction.

17. The method of claim 14 including depositing at least one of said reactants in varying amounts by printing.

References Cited

UNITED STATES PATENTS

| | | | |
|---|---|---|---|
| 2,118,144 | 5/1938 | Berman et al. | 73—356 |
| 2,945,305 | 7/1960 | Striekler | 73—356X |
| 3,059,474 | 10/1962 | Keller et al. | 116—114.20UX |
| 3,175,401 | 3/1965 | Geldmacher | 73—358 |
| 3,352,794 | 11/1967 | Abdo | 252—408 |

LOUIS R. PRINCE, Primary Examiner

D. M. YASICH, Assistant Examiner

U.S. Cl. X.R.

252—408